W. W. MORGAN & J. L. FITTS.
WATER AND AIR RELIEF VALVE FOR STEAM HEATING SYSTEMS.
APPLICATION FILED JAN. 3, 1906.

1,041,144.

Patented Oct. 15, 1912.

2 SHEETS—SHEET 1.

WITNESSES:
D. Webster, Jr.
P. M. Kelly.

INVENTORS
William W. Morgan
and James L. Fitts
BY
Attorney

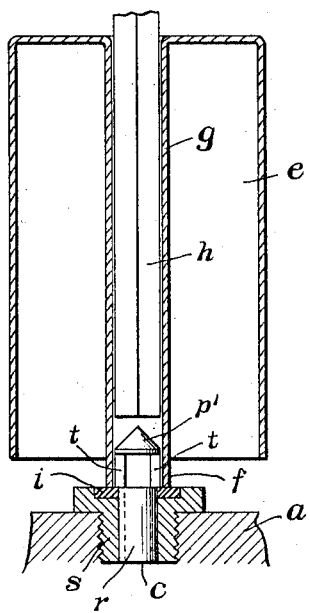
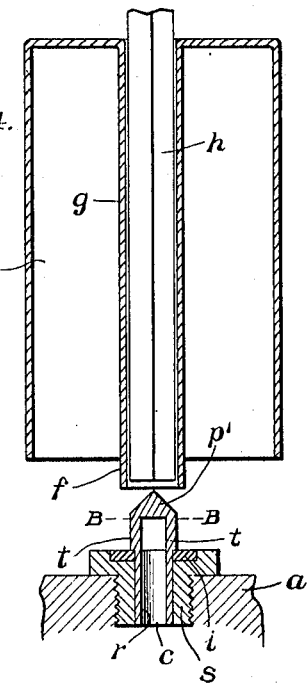
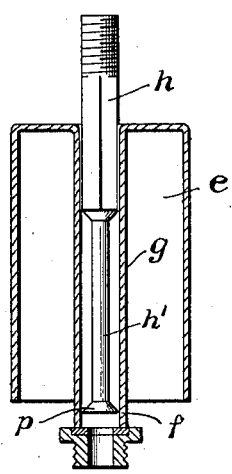
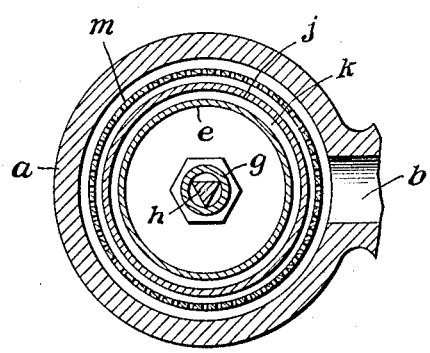
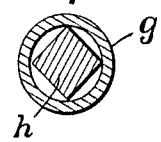
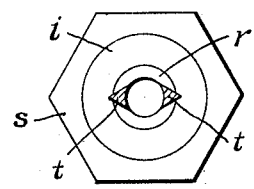

UNITED STATES PATENT OFFICE.

WILLIAM W. MORGAN, OF PHILADELPHIA, PENNSYLVANIA, AND JAMES L. FITTS, OF MERCHANTVILLE, NEW JERSEY, ASSIGNORS TO WARREN WEBSTER & COMPANY, A CORPORATION OF NEW JERSEY.

WATER AND AIR RELIEF VALVE FOR STEAM-HEATING SYSTEMS.

1,041,144.  Specification of Letters Patent.  Patented Oct. 15, 1912.

Application filed January 3, 1906. Serial No. 294,454.

*To all whom it may concern:*

Be it known that we, WILLIAM W. MORGAN, of the city and county of Philadelphia, State of Pennsylvania, and JAMES LOGAN FITTS, of Merchantville, county of Camden, and State of New Jersey, have invented an Improvement in Water and Air Relief Valves for Steam-Heating Systems, of which the following is a specification.

Our invention relates particularly to that class of valves in which a movable float or motor controlled by the accumulation of water in the valve body controls the outlet, and said float or motor is provided with a tubular portion, communicating with the outlet, through which air passes when the valve is closed. In such valves the float or motor is guided in its movements by a stationary guide extending into the tubular portion, and owing to the passage of small particles of foreign matter into this tubular portion, it is liable to bind on its guide, and the small space between the guide and tubular portion, which must be kept open for the passage of air, is liable to be clogged up.

It is the object of this invention, first to reduce the liability of the lodgment of particles of foreign matter in the tube, by increasing the area of the free passage between it and its guide, without decreasing the efficiency of the guide, second to remove such particles of matter as may adhere to the inner walls of the tube and thus keep them clean, and third to keep clean the lower end of the tube which rests upon the valve seat when the valve is closed.

Figure 1:
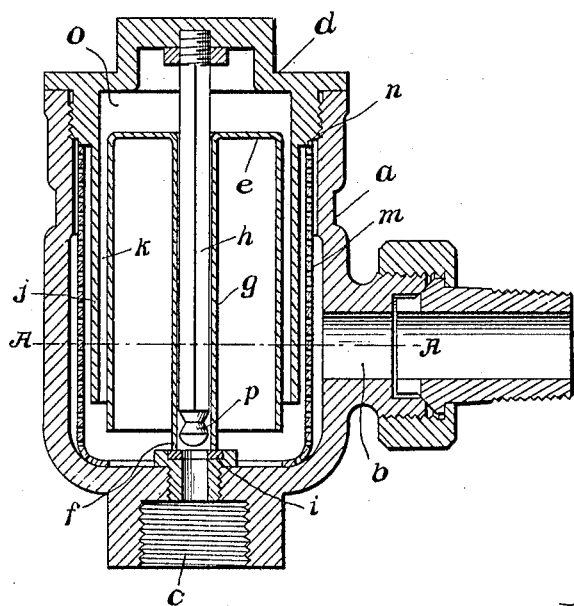
Figure 2:
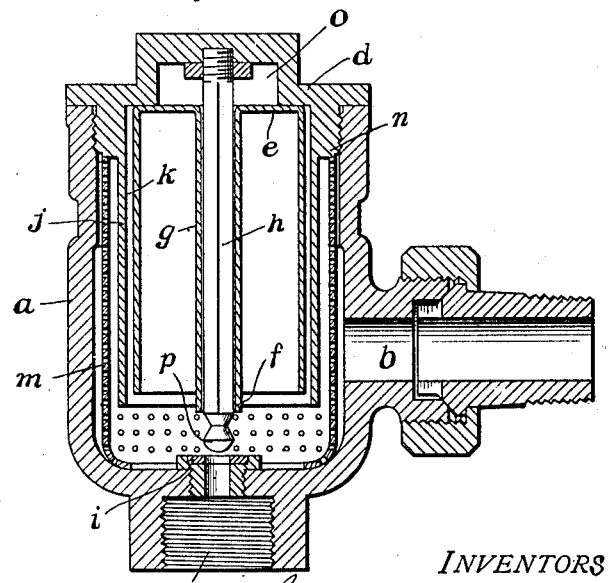

In the drawings: Figure 1 is a vertical sectional view of a water and air relief valve embodying our invention, with the valve closed to the escape of water of condensation; Fig. 2 is a similar view showing the valve open; Fig. 3 is a vertical section of part of the valve device showing a modification with the valve closed; Fig. 4 is a similar view with the valve open; Fig. 5 is a transverse horizontal section on the line A—A of Fig. 1; Fig. 6 is a horizontal section on the line B—B of Fig. 4; Fig. 7 is a transverse section of the tubular portion of the movable float or motor and its guide illustrating a modification; and Fig. 8 is a vertical section of part of the valve device illustrating a further modification.

The valve body $a$ may be of the usual character having an inlet $b$ and an outlet $c$. It is shown open at the top and provided with a removable screw threaded cap $d$.

$e$ is the motor within the valve body, which carries a valve-piece $f$ adapted to control the thoroughfare to the outlet. As shown this motor is a cup-shaped piece having a tubular portion $g$ open at the top and bottom, which is guided upon a depending guide stem $h$, carried by the cap, and the lower end of which constitutes the valve piece $f$. When the lower end of the tubular portion $g$, which constitutes the valve piece, is resting on the seat $i$, about the thoroughfare to the outlet $c$, as shown in Fig. 1, the lower edge of the surrounding body of the cup $e$ is elevated above the base of the body of the casing.

$j$ is a depending wall or cylinder preferably carried by the cap $d$ and surrounding the cup $e$ with a small clearance $k$ between its inner face and the outer face of the cup. This wall or cylinder is closed at the top and extends down toward the base of the casing preferably below the inlet $b$, but terminates at a distance above said base, so as to leave a clearance.

$m$ is a tubular screen surrounding the wall or cylinder $j$. It is usually formed of perforated metal, and at its lower end rests upon the base of the casing, its upper end being clamped by a shoulder $n$ of the cap $d$. The object of this screen is to prevent particles of matter that may be carried from the radiator from passing into the operative portions of the valve.

There is sufficient clearance between the tubular portion $g$ and the guide $h$ to permit such air as may pass into the valve body above the closed top of the cup to pass or be drawn out through the outlet $c$, while the valve piece $f$ is closed on the seat $i$. Air may thus be drawn from the inlet $b$ under the lower edge of the wall $j$, thence through the space $k$ and out through the clearance between the tube $g$ and guide $h$ to the outlet $c$, and the passageway thus afforded will be too small to permit the escape of any appreciable amount of steam.

So far as we have described the valve device it is of known construction and we do not claim it as of our invention. We will now describe our improvements as applied to a valve device of this general character.

It is essential to the proper operation of the cup $e$ that it should be guided positively by the stem $h$ without appreciable lateral motion, and at the same time there must be sufficient clearance to permit the air to be discharged. With a very small clearance between the tubular portion $g$ and the stem, such as will produce proper guidance, much difficulty has been experienced owing to the passage of small particles of dirt and foreign matter into the space between the tube $g$ and guide. Such matter lodging in this space acts to clog it up and to bind the tube and guide together and impede the movement of the cup. Oily and sticky matter also passes into the small clearance, and adhering to the inner walls of the tube $g$, interferes seriously with the sensitiveness of the cup. To overcome this difficulty we propose to make the stem $h$ angular in cross section. This enables the angular edges of the guide to fit very closely within the tubular portion $g$, so that the most effective guide is obtained, and at the same time the clearance or air passageway is increased, and may in fact be made too large to retain such small particles of matter as may pass the screen $m$. There is also another and important advantage secured by this stem of angular section. During the movements of the cup, there is more or less rotation about the guide as an axis, and consequently the angular edges of the guide will act as scrapers to scrape off or loosen from the tube $g$ such particles of sticky matter as may find their way into it and adhere to its surface.

We do not mean to confine ourselves to any particular angular cross section for the guide $h$. It may be triangular as shown in Fig. 5 or square as shown in Fig. 7, or in fact of any angular section which will accomplish the objects. It is not essential that this angular section should extend the whole length of the guide, and in Fig. 8 we have shown a modification in which the guide is of an angular section at the upper portion only, the lower portion $h'$ being merely of reduced diameter. In such case, however, the portion of reduced diameter does not act as a guide and is ineffective for scraping and cleaning the interior of the tube.

It is particularly desirable that the lower end of the tube $g$, which constitutes the valve piece $f$, should be kept clean and free from foreign matter. For this purpose we provide a small cleaning head or piece $p$, so placed that it will act upon the end $f$ of the tube $g$ as it rises and falls and scrape from it any particles of matter that may adhere. In the construction shown in Figs. 1, 2 and 8 this head or cleaning piece $p$ is on the lower end of the guide $h$ and has a more or less sharp angular edge which fits within the tube $g$ near its end. It should fit as closely as possible without affecting the freedom of movement of the tube $g$ or the discharge of air. To secure the best results this cleaning head or piece $p$ should be so located that when the cup $e$ is lifted, the end $f$ of the tube $g$ will pass entirely above its edge, as shown in Figs. 2 and 5. It results from this that when the tube rises the head $p$ will entirely remove from it any matter that may have been adhering to the extreme lower end. As the end $f$ rises above the head $p$ the latter will be exposed to the maximum clearance between the guide $h$ and tube and the water of condensation in the clearance—of which there is always some slight accumulation—will be permitted to discharge freely on the head $p$ and remove from it any particles of matter that may have adhered. This effect is further increased by making the head $p$ of conical form as shown. A special advantage of forming the head $p$ with a sharp edge, is that sand and other matter which pass into the tube cannot lodge on this sharp edge and be jammed fast on the inside of the tube, as might occur if the edge of the head was of any substantial thickness. There is almost always considerable sand in new radiators and this must be discharged through the valves. If grains of sand become jammed between the head and the walls of the tube, the valve would stick and become inoperative. This is effectually prevented by providing the head with the sharp edge. The grains of sand and such other matter as may pass into the tube are arrested by the sharp edged head, and when the tube rises and its end passes above the head, such arrested matter is washed off and freely discharged into the outlet.

Instead of placing the head $p$ upon the end of the stem it may be supported from the base of the valve body as shown in Figs. 3, 4 and 6. In this case the head $p'$ is carried by a tubular piece and fitting in the thoroughfare on the seat piece $s$ and carrying the head on bars $t$, $t$ which hold it at the proper elevation above the seat and afford openings for the discharge of the water through the tubular part $r$. To prevent particles of matter lodging on these bars $t$ $t$ they are preferably made angular or with knife edges as shown in Fig. 6. These bars will also act as scrapers to remove matter that may adhere to the lower end of the tube $g$.

What we claim is as follows:

1. In a water and air relief valve for steam heating systems, the combination of a body having an inlet and an outlet, a motor within said body controlling said outlet and provided with a tube, the lower end of which constitutes the valve piece, and a stationary head having a sharp edge closely fitting the lower end of the tube when the tube is lowered and acting to arrest foreign matter entering the tube, said head being located below the level assumed by the bottom of the tube when the tube is raised by the motor, so that the arrested matter on said head will be discharged when the tube is raised.

2. In a water and air relief valve for steam heating systems, the combination of a body having an inlet and an outlet, a motor within said body controlling said outlet and provided with a tube, the lower end of which constitutes the valve piece, and a stationary head of conical form, having a sharp edge closely fitting the lower end of the tube when the tube is lowered and acting to arrest foreign matter entering the tube, said head being located below the level assumed by the bottom of the tube when the tube is raised by the motor, so that the arrested matter on said head will be discharged when the tube is raised.

3. In a water and air relief valve for steam heating systems, the combination of a body having an inlet and an outlet, a motor within said body controlling said outlet and provided with a tube the lower end of which constitutes the valve piece, a stationary guide extending into said tube and provided with a head having a sharp edge closely fitting the lower end of the tube when the tube is lowered and acting to arrest foreign matter entering the tube, said head being located below the level assumed by the bottom of the tube when the tube is raised by the motor, so that the arrested matter on said head will be discharged when the tube is raised.

4. In a water and air relief valve for steam heating systems, the combination of a body having an inlet and an outlet, a tube one end of which is adapted to rest on the body and close the outlet with the interior of the tube in communication therewith, a motor carried by said tube and controlled by the accumulation of water in the body to lift said tube and open the outlet, a stationary guide piece carried by the valve body and extending down into said tube, and a head carried by the end of said guide within said tube and located below the level assumed by the bottom of the tube when the tube is raised by the motor and provided with a sharp edge adapted to scrape the inner walls of the tube when the same is raised.

5. In a water and air relief valve for steam heating systems, the combination of a body having an inlet and an outlet, a tube one end of which is adapted to rest on the body and close the outlet with the interior of the tube in communication therewith, a motor carried by said tube and controlled by the accumulation of water in the body to lift said tube and open the outlet, a stationary guide piece carried by the valve body and extending down into said tube, and a head carried by the end of said guide within said tube and located below the level assumed by the bottom of the tube when the tube is raised by the motor and provided with a sharp annular edge adapted to scrape the inner walls of the tube when the same is raised.

6. In a water and air relief-valve for steam heating systems, the combination of a body having an inlet and an outlet and provided with a tube, and a guide carried by the top of the body and extending down into the tube and provided with a clearing device adapted to guide the tube and scrape its inner walls when the tube is moved by the motor and located below the highest point assumed by the lower end of said tube when the same is raised.

In testimony of which invention, we have hereunto set our hands.

WM. W. MORGAN.
JAMES L. FITTS.

Witnesses:
R. M. KELLY,
PY. QUINN.

---

Copies of this patent may be obtained for five cents each, by addressing the "Commissioner of Patents, Washington, D. C."